United States Patent
Shen et al.

(10) Patent No.: US 7,299,020 B2
(45) Date of Patent: Nov. 20, 2007

(54) TUNABLE MULTI-BAND RECEIVER BY ON-CHIP SELECTABLE FILTERING

(75) Inventors: David H. Shen, Saratoga, CA (US); Ann P. Shen, Saratoga, CA (US)

(73) Assignee: NanoAmp Solutions, Inc., Santa Clara, CA (US)

(*) Notice: Subject to any disclaimer, the term of this patent is extended or adjusted under 35 U.S.C. 154(b) by 654 days.

(21) Appl. No.: 10/729,674

(22) Filed: Dec. 5, 2003

(65) Prior Publication Data

US 2004/0116097 A1    Jun. 17, 2004

Related U.S. Application Data

(60) Provisional application No. 60/431,977, filed on Dec. 10, 2002.

(51) Int. Cl.
*H04B 1/18* (2006.01)

(52) U.S. Cl. .................. 455/188.1; 455/302; 455/303

(58) Field of Classification Search ............. 455/552.1, 455/550.1, 179.1, 180.1, 180.2, 188.1, 188.2, 455/189.1, 190.1, 313, 318, 323, 324, 334, 455/302, 285, 303, 306
See application file for complete search history.

(56) References Cited

U.S. PATENT DOCUMENTS

| | | | |
|---|---|---|---|
| 4,972,509 A | | 11/1990 | Maejima |
| 5,423,064 A | * | 6/1995 | Sakata .................. 455/437 |
| 6,029,052 A | * | 2/2000 | Isberg et al. ............. 455/131 |
| 6,064,866 A | | 5/2000 | Lange |
| 6,405,025 B1 | * | 6/2002 | Keski-Mattinen ........... 455/266 |
| 6,584,304 B1 | * | 6/2003 | Thomsen et al. .......... 455/188.1 |
| 6,731,349 B1 | * | 5/2004 | Van Der Wijst ............ 348/732 |
| 6,804,261 B2 | * | 10/2004 | Snider ..................... 370/478 |

* cited by examiner

*Primary Examiner*—Nguyen T. Vo
(74) *Attorney, Agent, or Firm*—Fish & Richardson P.C.

(57) ABSTRACT

A multiple frequency RF communications receiver is disclosed which permits greater integration on standard silicon chips and consumes less power than previous receivers. A new method for selecting the various frequency bands with a high amount of isolation and low power consumption is described. Compared to previous receiver implementations, there is no loss of selectivity in the receiver.

19 Claims, 4 Drawing Sheets

TUNABLE MULTI-BAND RECEIVER BY ON-CHIP SELECTABLE FILTERING

This application claims benefit of application Ser. No. 60/431,977 filed Dec. 10, 2002.

REFERENCES

U.S. Pat. No. 6,064,866, May 16, 2000, Lange.
U.S. Pat. No. 4,972,509, Nov. 20, 1990, Maejima.

BACKGROUND—TECHNICAL FIELD OF INVENTION

The present invention relates to radio receivers and methods for the reception of RF (radio frequency) communications signals in multiple frequency bands. In particular, it relates to integrated circuit based radio receivers using programmable on-chip tuning.

BACKGROUND OF THE INVENTION AND DISCUSSION OF PRIOR ART

At the present time, the vast majority of RF communications receivers are of the superheterodyne type. This type of receiver uses one or more IF (intermediate frequency) stages for filtering and amplifying signals at a fixed frequency within an IF chain. This radio architecture has the advantage that fixed filters may be used in the LO chain. In order for the receiver to be useable over multiple bands, its typical architecture is as the dual-band receiver shown in FIG. 1. An RF signal arriving at an antenna 11 passes through a band-select RF filter for each band 13 and 14, an LNA (low noise amplifier) for each band, 15 and 16, and into an image filter for each band, 17 and 18, which produce a band-limited RF signal. This band-limited RF signal then enters a first mixer for each band 19 and 20, which translates the RF signal down to an intermediate frequency by mixing it with the signal produced by the first LOs (local oscillators) 21 and 22. The undesired mixer products in the IF signal are rejected by an IF filter for each band, 23 and 24. The filtered IF signal then enters an IF amplifier stage for each band, 25 and 26, after which the outputs are merged into the second mixer 27 which translates it down to yet another intermediate frequency by mixing it with the signal produced by a second LO, 28. The signal is then sent to the baseband processing. Tuning into a particular channel within the band-limited RF signal is accomplished by varying the frequency of each LO, 21 and 22.

In order to reduce size, power consumption, and cost, it would be advantageous to integrate the electronic components of radio receivers and reduce the number of filters and mixers. The superheterodyne design, however, requires high quality, narrowband IF bandpass filters that are typically implemented off-chip. These filtering components impose a lower limit to the size, materials cost, assembly cost, and power consumption of receivers built using the superheterodyne design. Moreover, the necessity for mixer and local oscillator circuits operating at high frequencies contributes greatly to the power consumption and general complexity of the superheterodyne receiver. In particular, the high-frequency analog mixers require a large amount of power to maintain linear operation. Although many variations of the superheterodyne design exist, they all share the limitations of the particular design just described.

The growing demand for portable communications has motivated attempts to design radio receivers that permit the integration of more components onto a single chip. Recent advances in semiconductor processing of inductors are allowing more and more of these filters to be implemented on-chip.

A second receiver design is the direct-conversion, or zero-IF, receiver shown in FIG. 2. An antenna 57 couples a RF signal through a first bandpass RF filter for each frequency band, 59 and 60, into a LNA for each frequency band, 61 and 62. The signal then proceeds through a second RF filter 63 and 64, yielding a band-limited RF signal, which then enters a mixer for each frequency band, 65 and 66, and mixes with an LO frequency produced by an LO for each frequency band, 67 and 68. Up to this point, the direct-conversion receiver design is essentially the same as the previous receiver design.

Unlike the previous designs, however, the LO frequency is set to the carrier frequency of the RF channel of interest. The resulting mixer product is a zero-frequency IF signal—a modulated signal at baseband frequency. The mixer outputs, 67 and 68, are combined before being coupled into a lowpass analog filter 69 before proceeding into baseband information signal for use by the remainder of the communications system. In either case, tuning is accomplished by varying the frequency of LOs, 67 and 68, thereby converting different RF channels to zero-frequency IF signals.

Because the direct-conversion receiver design produces a zero-frequency IF signal, its filter requirements are greatly simplified—no external IF filter components are needed since the zero-IF signal is an audio frequency signal that can be filtered by a low-quality lowpass filter. This allows the receiver to be integrated in a standard silicon process from mixer 65 onwards, making the direct-conversion receiver design potentially attractive for portable applications.

The direct-conversion design, however, has several problems, some of which are quite serious. As with the other designs described above, the RF and image filters required in the direct-conversion design must be high-quality narrowband filters that must remain off-chip. Moreover, this design requires the use of high-frequency mixer and LO circuits that require large amounts of power. Additionally, radiated power from LOs, 67 and 68, can couple into antenna 57, producing a DC offset at the output of mixers, 65 and 66. This DC offset can be much greater than the desired zero-IF signal, making signal reception difficult. Radiated power from LOs 67 and 68, can also affect other nearby direct-conversion receivers tuned to the same radio frequency. Furthermore, to receive signals transmitted using modulation techniques (such as FM) in which access to both the lower and upper sidebands is required, two mixers and two LOs are required to produce both an in-phase and a quadrature baseband signal. Not only does this increase the power required by the receiver, but also the phase between the two LO signals must be precisely maintained at 90 degrees to prevent demodulation distortion. This can be difficult to accomplish with variations in temperature and other operational parameters.

Other prior art to address the multiple frequency band radios use diode-based switches to select the frequency band of interest in a filter bank as in U.S. Pat. Nos. 6,064,866[1] and 4,972,509[2]. However, these implementations require a significant number of inductor and capacitor components, and the process of switching a diode element introduces an equivalent impedance element in the resonant tank, thereby reducing the quality (Q) factor of the resonant circuit, thus reducing the performance of the receiver.

In summary, although the prior art includes various receiver designs for multi-band radios, each one has significant disadvantages including one or more of the following: the necessity for several external circuit components, the consumption of large amounts of power, poor signal reception, poor selectivity, distortion, and limited dynamic range.

OBJECTS AND ADVANTAGES OF THE INVENTION

Accordingly, it is a primary object of the present invention to provide a multiple frequency band radio receiver design, which has increased integration and decreased power consumption without the operational problems associated with previous receiver designs. It is a further object of the invention to provide an equivalent performance to the traditional multi-band superheterodyne receiver of FIG. 1.

SUMMARY OF THE INVENTION

The present invention achieves the above objects and advantages by providing a new method for multiple frequency band RF communications signal reception and a new receiver design that incorporates this method. This method includes a method for tuning the receiver to multiple frequency bands without loss of quality factor. In addition, it provides a mechanism to combine the multiple frequency band signals before the mixer, thus requiring only one signal path at the mixers and IF stages.

DESCRIPTION OF THE PREFERRED EMBODIMENT

Figure 1:
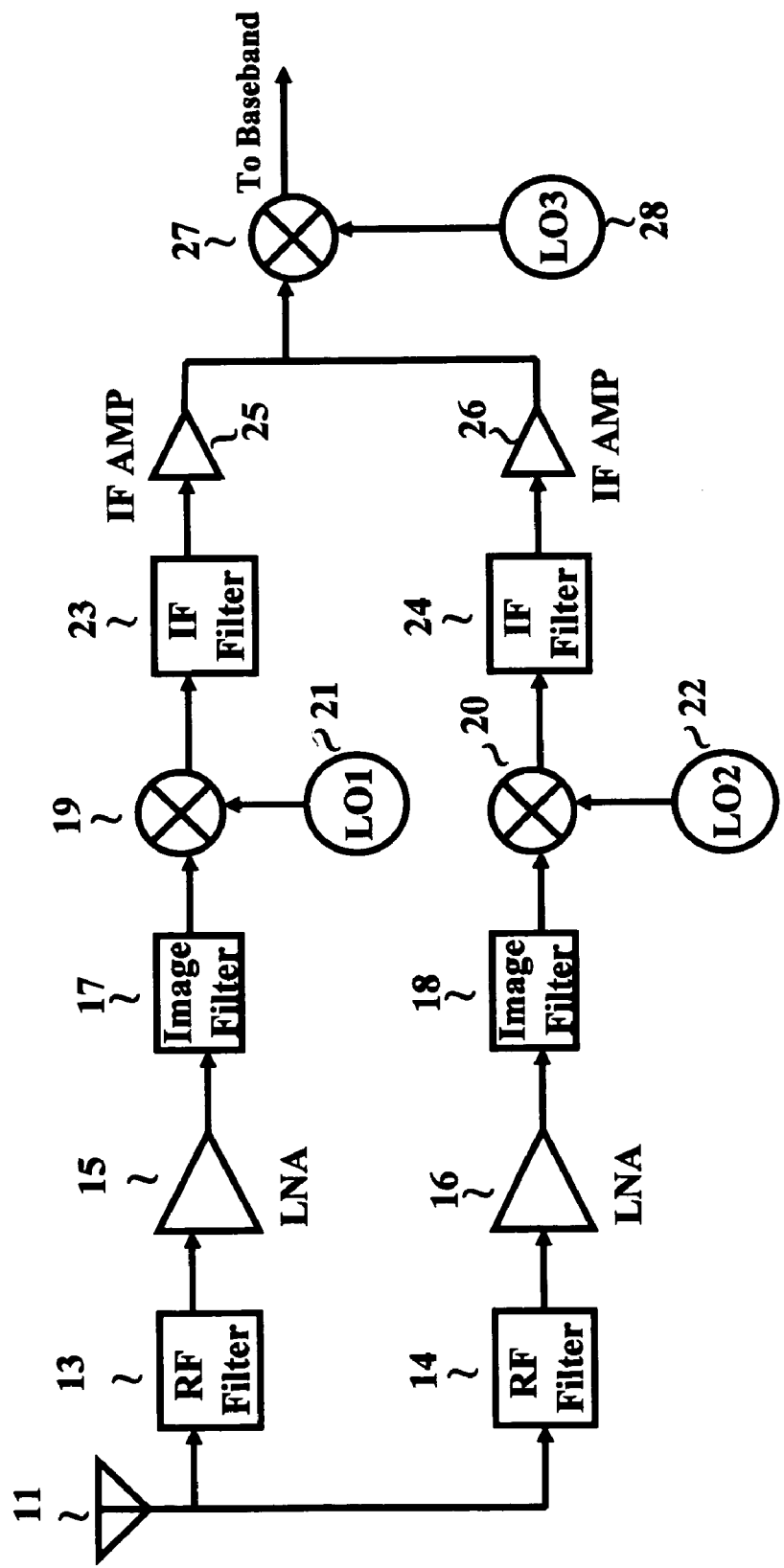
FIG. 1 is a block diagram of a dual-band superheterodyne receiver considered as prior art.
Figure 2:
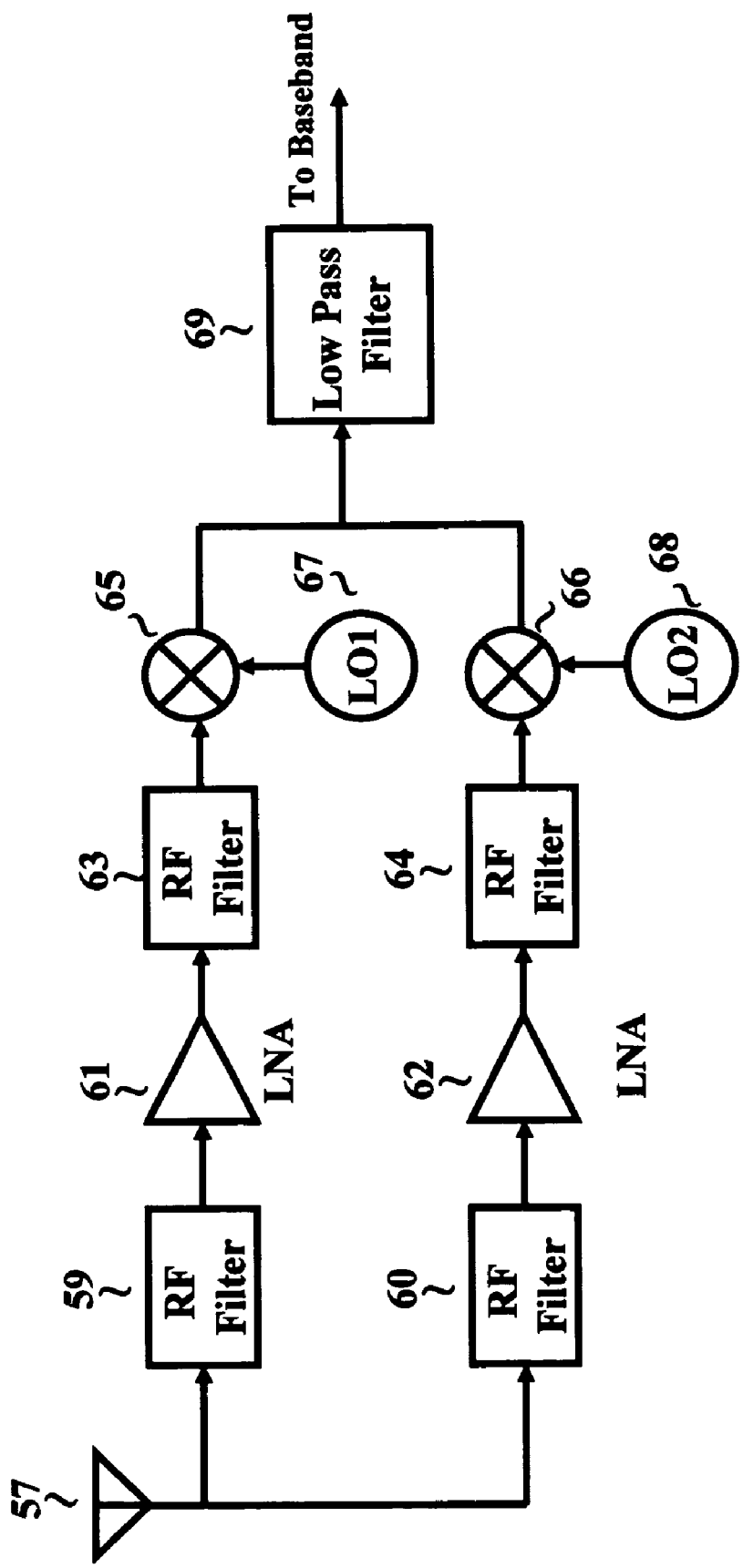
FIG. 2 is a block diagram of a direct-conversion receiver considered as prior art.
Figure 3:
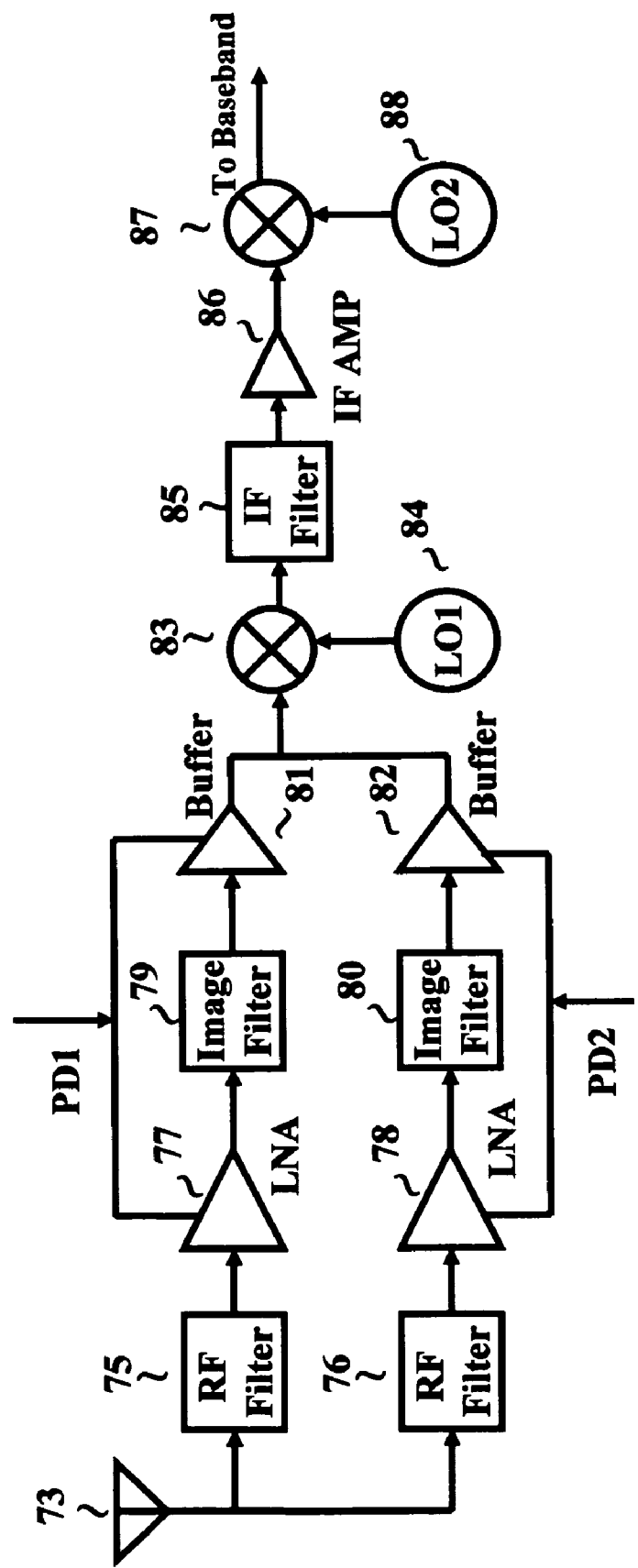
FIG. 3 is a block diagram of a receiver constructed with the principles of the invention.

FIG. 3 is a block diagram of a dual-band RF communications receiver constructed in accordance with the principles of the present invention. It includes an antenna 73 for coupling a RF signal into the input of a bandpass RF filter, 75 and 76, for each frequency band. The output of the analog bandpass RF filters, 75 and 76, connects to the input of an LNA, 77 and 78, for each frequency band and whose output couples to the input of an image filter, 79 and 80, for each frequency band. The architecture differs from the tradition receiver at this point. Two buffers, 81 and 82, have outputs that are combined together. Each LNA, 77 and 78, and buffer, 81 and 82, have power down controls, PD1 and PD2, which enable one frequency band to be selected versus the other frequency band. The method of powering down the circuits enables high isolation that is not achievable in other switchable filters in the prior art U.S. Pat. Nos. 6,064,866[1] and 4,972,509[2]. The combined output is then fed into the first mixer, 83, mixed with the output of the first local oscillator, 84. The output of the first mixer, 83, is then fed into an IF filter, 85, and an IF amplifier, 86. The output of the IF amplifier, 86, is then fed into the second mixer, 87, where it is mixed with the second local oscillator, 88. The savings in this architecture compared to the prior art of FIG. 1 is that one local oscillator, one mixer, one IF filter, and one IF amplifier can be eliminated at the cost of two buffers. This saves in die area and power, as well as board area if the IF filter is implemented as an off-chip component.

Figure 4:
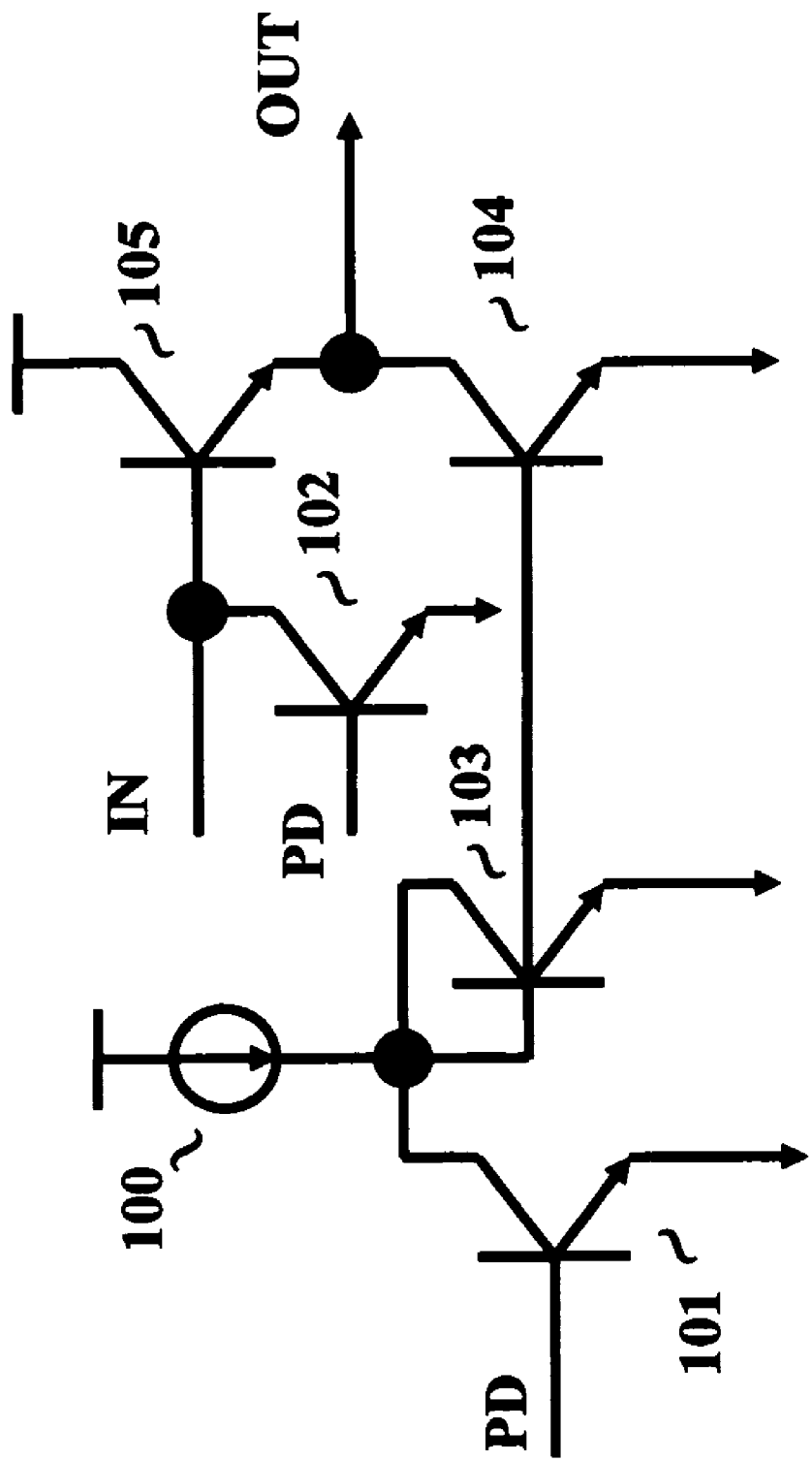
FIG. 4 is an example of an implementation of the buffer of FIG. 3.

FIG. 4 gives a possible implementation of the buffer stage as an emitter follower. The emitter follower circuit consists of a current source, 100, power down control transistors, 101 and 102, a diode-connected transistor, 103, and current mirroring transistor, 104, and a follower transistor, 105. The PD signal, when high, shuts down the currents in transistor, 104, and 105, thus causing the buffer to shut down and isolate its input, IN, from its output, OUT. The operation of this circuit is well known in the art. Additionally, those skilled in the art will recognize that the choices available in type of buffer can include source followers, as well as non-unity gain amplifiers. Those skilled in the art will also recognize that the power-down signal in the LNA can also be eliminated very little change in functionality. Additionally, those skilled in the art will recognize that more frequency bands can be added to receiver, and that the addition of more frequency bands is within the scope of this patent. These and other modifications, which are obvious to those skilled in the art, are intended to be included within the scope of the present invention. Accordingly, the scope of the invention should be determined not by the embodiment described, but by the appended claims and their legal equivalents.

The invention claimed is:

1. A multiple frequency band receiver for selecting a multiple frequency band RF signal and having reduced number of components in a RF front end system, the receiver comprising:
   an amplifier for each frequency band with an output connected to an input of filter for each frequency band, wherein the output of said filter for each frequency band is coupled to an input of a buffer stage for said each frequency band, and an output of each said buffer stage is coupled together; and
   a mechanism to power down each of the buffer stages in order to select a frequency band.

2. The receiver of claim 1 wherein the receiver comprises an architecture that is any of a superheterodyne architecture, a low-intermediate frequency, a direct conversion, or a quasi-direct conversion type.

3. The receiver of claim 1 wherein the output of each of said buffer stages is connected to an input of a mixer.

4. The receiver of claim 1 further comprising a low noise amplifier (LNA) for said each frequency band and each non-selected frequency bands, wherein the receiver is configured to power down the non-selected frequency bands to improve isolation of the non-selected frequency bands.

5. The receiver of claim 1 wherein each of the buffer stages comprise emitter follower circuits.

6. The receiver of claim 1 wherein each of the buffer stages comprise source follower circuits.

7. The receiver of claim 1 wherein each of the buffer stages comprise an amplifier topology including a low noise amplifier with power down capability.

8. The receiver of claim 1 wherein a number of selectable frequency bands is an integer N, where N>1.

9. The receiver of claim 1 wherein the filters are external components to an RF chip.

10. The receiver of claim 1 wherein the filters are integrated resonant elements on an RF chip.

11. The receiver of claim 1 wherein the receiver is implemented with CMOS, bipolar, BiCMOS, or SiGe technologies.

12. A method of receiving multiple frequency bands by selecting a multiple frequency band RF signal and of reducing the a number of components in an RF front end system, the method comprising:

amplifying a multiple frequency band RF signal for each frequency band;

filtering said amplified multiple frequency band RF signal for said each frequency band;

buffering said filtered multiple frequency band RF signal for said each frequency band with buffer stages that have outputs connected together; and powering down the buffer stages to select a frequency band.

13. The method of claim 12 wherein the method of receiving comprises receiving with a receiver architecture type that comprises any of a superheterodyne, a low-intermediate frequency, a direct conversion or a quasi-direct conversion type.

14. The method of claim 12 wherein the buffered and selected RF signal is mixed by a mixer.

15. The method of claim 12 wherein the multiple frequency band RF signal is further amplified by a low noise amplifier (LNA) for each frequency band and a non-selected frequency band is configured to be powered down to improve isolation of the non-selected frequency band.

16. The method of claim 12 wherein the buffer stages comprise emitter follower or source follower circuits.

17. The method of claim 12 wherein the buffer stages comprise a low noise amplifier with power down capability.

18. The method of claim 12 wherein the buffer stages comprise an amplifier topology including a low noise amplifier with power down capability.

19. The method of claim 12 wherein a number of selectable frequency bands is an integer N, where $N>1$.

* * * * *